United States Patent [19]
Voss et al.

[11] Patent Number: 5,557,982
[45] Date of Patent: Sep. 24, 1996

[54] COMPOSITE BICYCLE HANDLEBAR

[75] Inventors: Darrell W. Voss; Gary G. Klein; Richard Randall, all of Chehalis, Wash.

[73] Assignee: Klein Bicycle Corporation, Chehalis, Wash.

[21] Appl. No.: 415,022

[22] Filed: Mar. 30, 1995

Related U.S. Application Data

[63] Continuation of Ser. No. 947,817, Sep. 21, 1992, abandoned.

[51] Int. Cl.$^6$ ........................................ B62K 21/12
[52] U.S. Cl. .................. 74/551.1; 280/279; 280/281.1; 428/113; 428/292; 428/294
[58] Field of Search ............... 74/551.1–551.8; 428/113, 36.1, 36.2, 246, 292, 294, 297, 408, 902; 280/279, 281.1

[56] References Cited

U.S. PATENT DOCUMENTS

| | | | |
|---|---|---|---|
| 4,318,948 | 3/1982 | Hodgson | 428/113 |
| 4,759,147 | 7/1988 | Pirazzini | 428/113 |
| 4,828,285 | 5/1989 | Foret et al. | 280/279 |
| 4,900,048 | 2/1990 | Derujinsky | 280/281.1 |
| 4,940,617 | 7/1990 | Baurmeister | 428/113 X |
| 5,039,470 | 8/1991 | Bezin et al. | 280/279 X |
| 5,048,441 | 9/1991 | Quiqley | 428/294 X |
| 5,049,422 | 9/1991 | Honma | 428/113 |
| 5,061,533 | 10/1991 | Gomi et al. | 428/113 X |
| 5,110,644 | 5/1992 | Sparks et al. | 428/113 X |
| 5,188,384 | 2/1993 | Van Raemdonck | 280/281.1 |

FOREIGN PATENT DOCUMENTS

| | | | |
|---|---|---|---|
| 0062973 | 10/1982 | European Pat. Off. | 428/113 |

*Primary Examiner*—Vinh T. Luong
*Attorney, Agent, or Firm*—Jim Zegeer, Esq.

[57] ABSTRACT

A high efficiency lightweight bicycle handlebar using strong, stiff fibers and a structural resin is disclosed. Relatively low modulus fibers are used in the axial direction and relatively high modulus fibers in the transverse or hoop direction. The hoop fibers are placed on the inside and outside diameters.

18 Claims, 6 Drawing Sheets

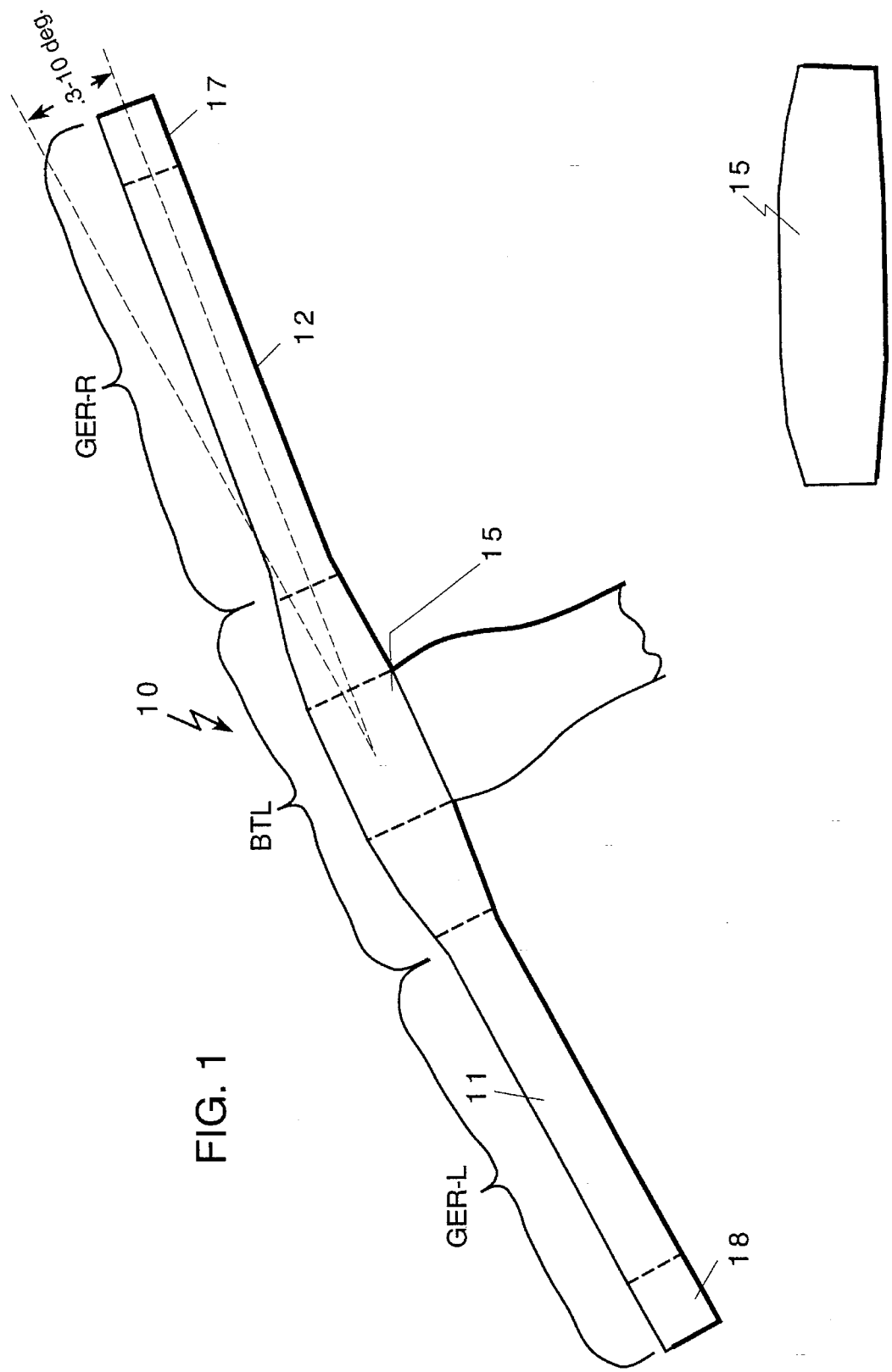

COMPOSITE BICYCLE HANDLEBAR

This is a continuation of application Ser. No. 07/947,817, filed Sep. 21, 1992, which was abandoned upon the filing hereof.

TECHNICAL FIELD

The present invention relates to bicycle handlebars. In particular, the present invention relates to ultralight high performance handlebars made from composite materials using high strength, relatively low modulus fibers in the axial direction and relatively high modulus fibers in the transverse or hoop direction or fibers placed on inside diameter and outside diameter in the hoop direction. More particularly, the invention relates to a composite handlebar combination with an integral neck and still more particularly a composite handlebar combined with an integral neck which houses a suspension system.

PRIOR ART

For many years, bicycle handlebars have been made from bent metal tubes. The most common material used for this application has been steel. However, high performance bicycles are generally fitted with handlebars made from straight or tapered and bent aluminum tube to reduce weight in the finished product. Significant advances have been made in the last ten years in reducing the weight of bicycle handlebars by using more advanced aluminum alloys, more optimized designs, and more sophisticated manufacturing methods (for example, see U.S. Pat. No. 5,002,297 to Klein). However, aluminum designs are limited in their ultimate stiffness-to-weight and strength-to-weight ratios by the inherent material properties of aluminum.

Carbon/epoxy composite materials possess higher stiffness-to-weight and strength-to-weight ratios than aluminum alloys and thus present the potential for more efficient structures. In addition, carbon/epoxy composite materials are less sensitive to cyclic fatigue failure than aluminum.

Some companies have endeavored to capitalize on these advantages of composites to produce high performance bicycle handlebars, but the weight and/or the strength of these handlebars have not been significantly better than the best aluminum designs. For example, a recent prior art design which is made by filament winding carbon/epoxy fails at 1000 pounds in three point bending on a 20 inch span, but it weighs 150 grams. Thus, the need exists for a handlebar which takes full advantage of the superior properties of composites and shows a significant performance/weight advantage over the handlebars currently available to the competitive bicycle rider.

SUMMARY OF THE INVENTION

The present invention is directed to an ultra-lightweight, stiff and strong molded bicycle handlebar using relatively low modulus, about 30 to 40 million psi, reinforcing fibers in the axial direction and relatively high modulus, 40 million psi or higher reinforcing fibers in the transverse direction in a thermosetting or thermoplastic structural resin.

Prior art bars have used predominantly axial fibers with a woven or cloth outside layer, a wrap of completely cloth fibers, or a thin layer of cloth fibers wrapped over a traditional aluminum alloy bar. Some of these bars have achieved adequate strength by utilizing thick, relatively heavy walls. The bars made from woven cloth do not typically exhibit as high properties as those made from unidirectional fibers. The result of the woven structure of the fibers is that the fibers have multiple bends in them, and under loading these are both weaker and less rigid than the unidirectional fibers. The woven cloth also has more epoxy (or other matrix material) per fiber volume due to the internal spaces created by the weave.

Based on the published strength of the fiber material, it seemed possible to make a very light weight, high strength handlebar. Yet when these were fabricated with the fibers placed in the obvious stress directions, the bars failed prematurely.

The object of the present invention includes providing improved composite bicycle handlebars which are strong, lightweight and relatively easy to manufacture and relatively inexpensive.

The present invention utilizes fiber placement and fiber stiffness along with appropriate metal reinforcements in order to create a high strength handlebar capable of resisting 900 lbs combined force (450 lbs per side) in the downward direction applied where the hand grips would be located (10 inches each direction from center). This design is also capable of resisting fatigue loading of 700 lbs (350 lbs/side) for approximately 33,000 cycles. Comparable heavier aluminum designs fail at 1,000 to 6,500 cycles in identical testing. The hoop fiber placement is necessary in order to maintain the circular or other shape of the tube and in order to hold the axial fibers in place under high tensile and compressive loading conditions. It is not desirable to use an excessive amount of axial fibers as the weight and road shock transmitted through the bar increase with increasing amounts of high property axial fiber. Some bars with straight axial fiber or axial fiber with a woven or cloth outside layer failed in compression near the stem clamp assembly or bend/tapered region.

The preferred configuration according to the present invention uses a high strength light weight metal sleeve, (for example, 7075 T6 aluminum alloy, having exemplary wall thickness of 0.030", an outer diameter of about one inch or more, and approximately 3.5 inches in length), and two very light short metal sleeves (having exemplary dimensions of about 0.875 inches in diameter) at each end of the bar. The center metal sleeve is to reinforce the bar where the stem clamps around it and the end sleeves are to resist end impacts such as from minor crashes and the extra stress placed on the bar when bar end extensions are mounted. In order to keep the fiber matrix stable in the bend and tapered areas and next to the stem clamp, it is necessary to use almost as much fiber in the hoop direction in order to keep the axial fibers in alignment and to maintain the desired tube section. In this case a higher modulus hoop fiber than the axial fiber is a benefit, and allows one to use less total fiber weight. The objective is not to obtain the maximum possible bending stiffness in this bar, but a combination of high properties including a small degree of flex in the up and down direction.

The preferred configuration results in a high strength handlebar with an exemplary weight of about 110 grams or less in weight in a full length bar of about 580 mm in length. Some of the lightweight bars on the market achieve their light weight by shortening the bar, in some cases reducing its usefulness.

The different ways of increasing hoop stiffness used successfully in the practice of this invention are:

1. use enough hoop fiber, interleaved with the axial fiber throughout the whole section, with increasing numbers of layers of both axial and hoop fiber in the high stressed regions to provide the required strength. This can be called the tapered ply construction.

2. place an outer layer or layers of hoop fiber (but underneath the top cloth abrasion layer) inside of which are the axial fiber layers, finished with an inside layer or layers of hoop fiber. This is more like an aircraft honeycomb construction, with hoop stressed skin on the top and bottom surfaces.

3. a combination of the two methods above, where there is a small amount of hoop fiber in the axial placements, and more hoop fiber on the inside diameter and outside diameter of the tube.

4. in all of the above, the higher modulus high strength carbon hoop fiber provides more benefit per weight than a lower modulus fiber.

As a smoothly bent tube is loaded, the tension compression forces in the region of the bend tend to take the tube out of a round shape. The tube begins to flatten in some areas, and increase in others. The result is that the tube section becomes much weaker and more prone to failure. A similar problem occurs in the area of the stem clamp. The clamp is holding the bar by compression, which places shear stress on the axial oriented fibers. On application of load, this creates a stress riser at the edge of the clamp. Carbon fiber composite materials are typically much less strong in shear than in tension or compression. Under loading, the stem causes a crease or dent in the tube right at the edge of the stem clamp, again distorting the tube shape and weakening the section strength. In both of these cases it was found that reinforcing the tube in the hoop direction with either metal or hoop oriented fiber placement increased the bar strength dramatically, and supported the stem clamp forces by putting the hoop fibers in that area in compression.

The interleaved fiber seems to strengthen the tube by physically holding the axial fiber layers together and in place, as well as stiffening the tube in the hoop direction and thus maintaining optimum tube geometry.

The skin hoop construction provides more hoop stiffness per weight of fiber, but lacks some of the interleaved plywood reinforcing effect.

The combination of interleaved and inner and outer layers of hoop fiber seems to provide the, best efficiency.

In order to fit standard bicycle grips, brakes, and shifters, the grip region of the handlebars on each end must be circular with a diameter of about 0.875 inches. The handlebars are symmetric about the centerline of the bicycle. For high strength and low weight, the center section of the bar is preferably of larger section than the grip. A commonly used size in the center is one inch round diameter. Bars incorporating the invention have been made in larger sizes with improved properties and shapes other than circular are contemplated and envisioned. Also, in order to fit the cyclist's riding and hand positions best, the bars need to angle backwards toward the rider. Typically an angle of 3 to 10 degrees is used.

Another version of the handlebar does not fit into a standard handlebar stem clamp, but is integrally molded to the neck of the stem. In this configuration, the center metal sleeve is not needed or desired, but the need for the hoop fiber remains. Moreover, the neck can incorporate and house a handlebar suspension system.

The present invention provides a design for an ultralightweight, stiff and strong molded bicycle handlebar using relatively low modulus high strength reinforcing fibers in the axial direction and relatively high modulus reinforcing fibers in the transverse direction in a thermosetting or thermoplastic structural resin. The composite material may be made up of unidirectional or woven fibers made of carbon, aramid or glass impregnated with epoxy, vinyl ester, or other thermosetting resin. The raw material in this form is called "prepreg".

DESCRIPTION OF THE DRAWINGS

The above and other objects, advantages and features of the invention will become more apparent when considered with the following specification and accompanying drawings wherein:

FIG. 1 is an isometric view of a composite handlebar incorporating the invention, FIG. 4 is a view of a metal sleeve incorporated in the invention.

DETAILED DESCRIPTION OF THE INVENTION

Figure 3A:
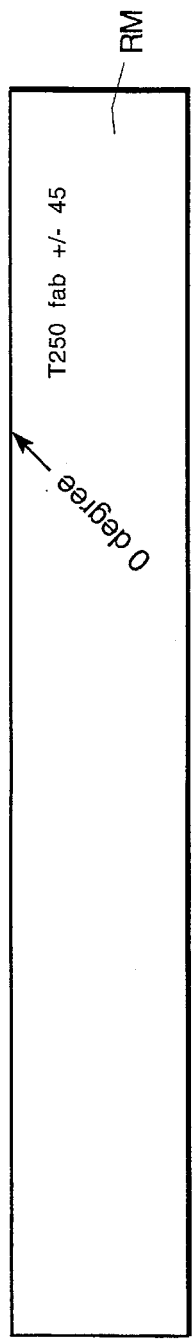
FIG. 3 is a carbon fiber bar layer flat pattern (a) being the inner layer, (b) being for the intermediate layers, and (c) being the pattern for the outermost layers.

Referring to FIG. 1, a handlebar 10, incorporating the invention has left and right tubular arms 11 and 12. A, carbon fiber layup flat pattern is shown in FIGS. 3a and 3c. The embodiment of FIG. 1 is adapted to be clamped by a conventional neck and stem assemble 16 for attachment to a bicycle. In such case, a metal sleeve 15 is incorporated in composite bar assembly to smooth the transition from metal composite to all composite and prevent the fibers from being molded into a sharp bend at the sleeve or creating stresses in the finished part. Preferably, short aluminum alloy sleeves 17 and 18 are incorporated in the lateral tips or ends of arms 11 and 12. Preferably the diameters are 0.875 inches so they can receive standard grips, brakes, shifters, etc.

Figure 2A:
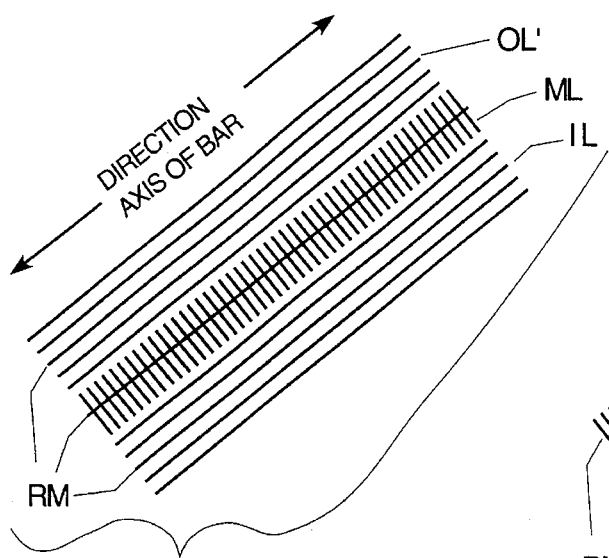
FIGS. 2a, 2b and 2c are diagrammatic illustrations of the fiber type and orientations thereof in several embodiments of the invention

FIG. 2a shows a unidirectional axial fiber outer layer OL-1, unidirectional transverse or hoop fiber middle layer ML-1 and an inner unidirectional axial fiber layer IL-1, which are laid-up on a lay-up table and rolled on a mandrel as described later in the section entitled "Methods of Manufacture".

Figure 2B:
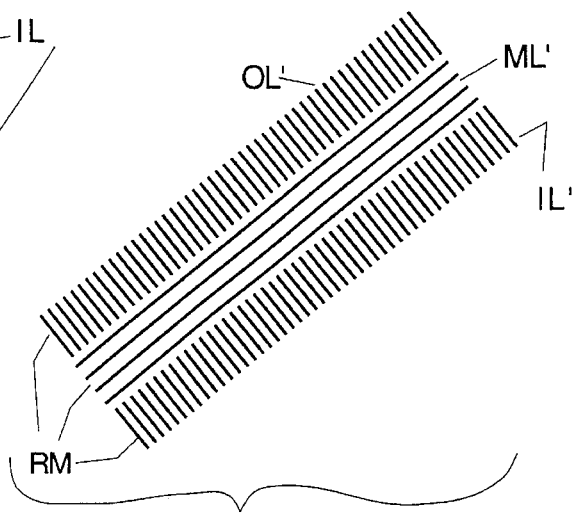

FIG. 2b shows a unidirectional transverse or hoop outer layer OL-2, a unidirectional axial fiber middle layer ML-2 and a unidirectional transverse or hoop inner layer IL-2, which are rolled on a mandrel as described in the section entitled "Methods of Manufacture".

Figure 2C:
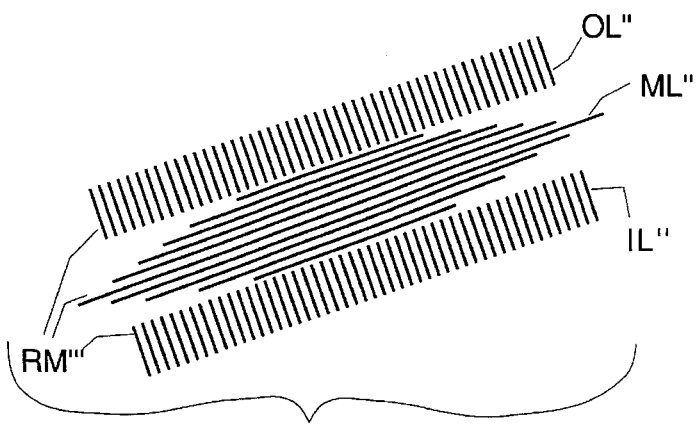
Figure 2D:
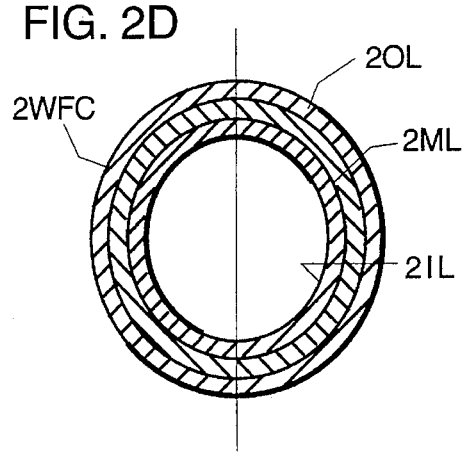
FIG. 2d is a sectional view through lines BB of FIG. 1 showing the plies of FIGS. 2a–2b rolled up.

FIG. 2c shows unidirectional transverse or hoop outer layer OL-3, an unidirectional axial fiber middle layer ML-3 in which there is a decrease in numbers of axial fibers at the lateral ends LE-1 and LE-2 and the amount of axial fibers are a maximum in the center of the bar CB. An unidirectional transverse or hoop layer forms the inner layer IL-3.

Metal sleeve 15 and hollow metal tips 17 and 18 (not shown in FIGS. 2 and 3) are incorporated on the outside of the bar to improve the resistance to clamping forces and by being external, it improves the abrasion resistance. The end metal tips 17 and 18 resist end impacts such as from minor crashes.

Figure 3B:
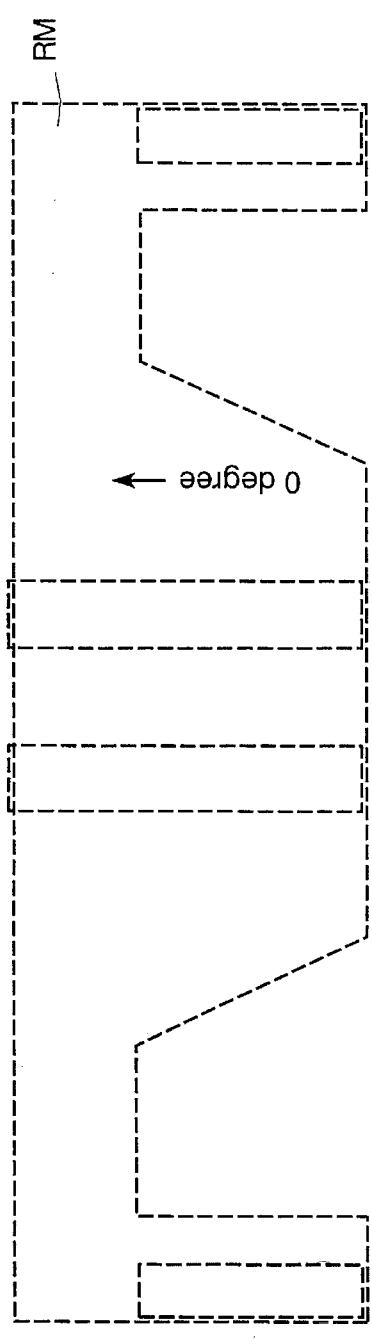
Figure 3C:
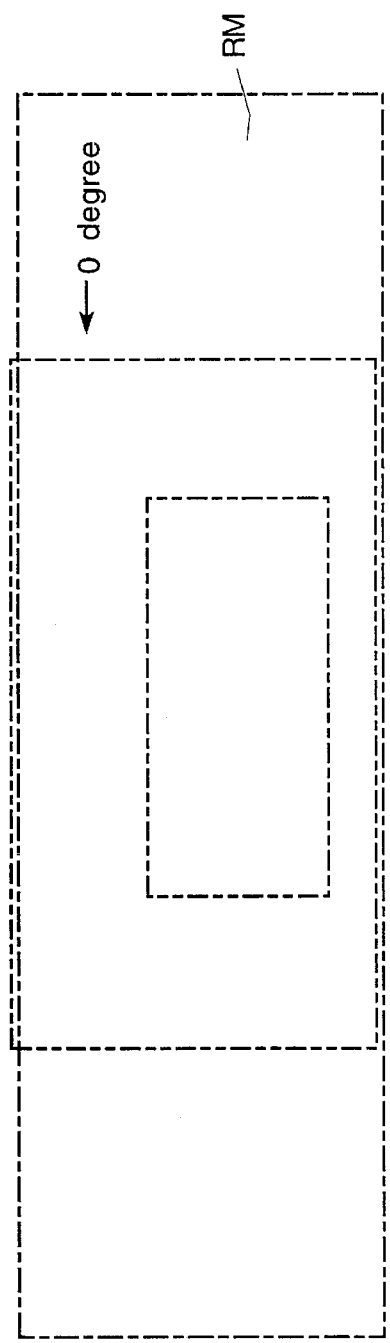
Figure 5A:
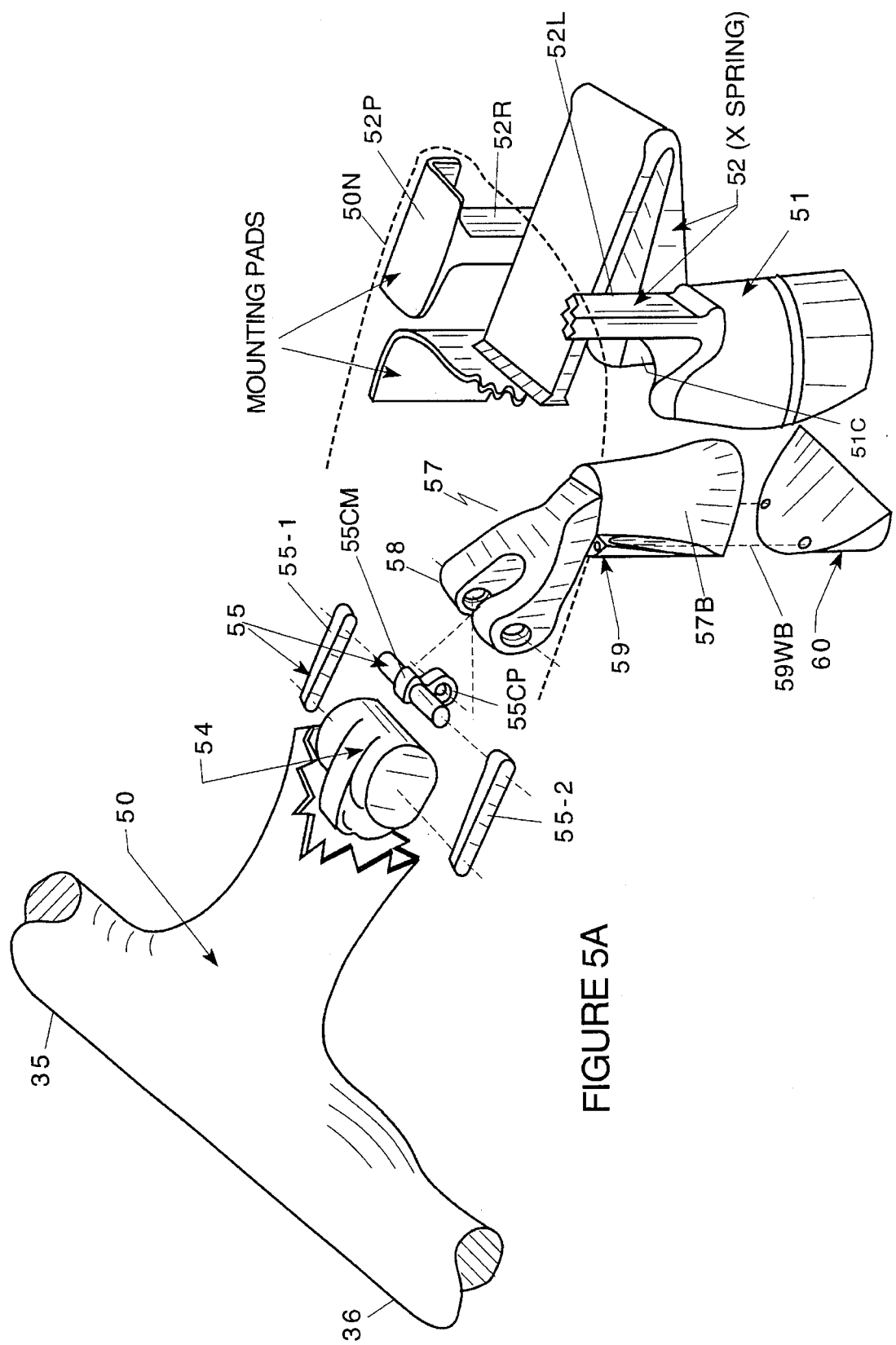
FIG. 5a is an exploded isometric view of a handlebar suspension system in which a combined handlebar and neck houses a rotary damper and linkage for a composite handlebar suspension system, FIG. 5b show the components of FIG. 5a assembled.
Figure 5B:
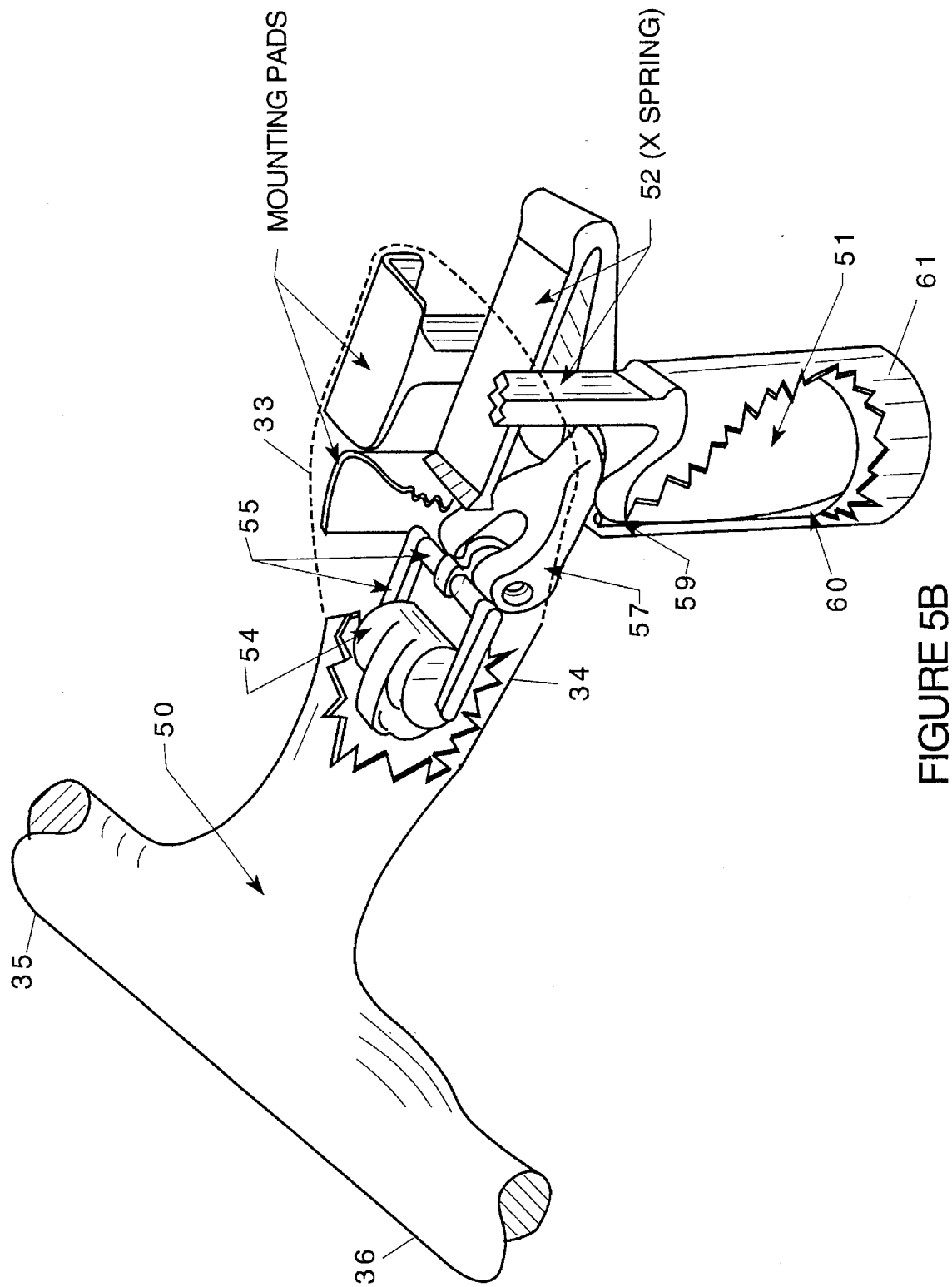
FIG. 5c is a sectional view of the neck portion with the suspension components in their relative positions.
Figure 5C:
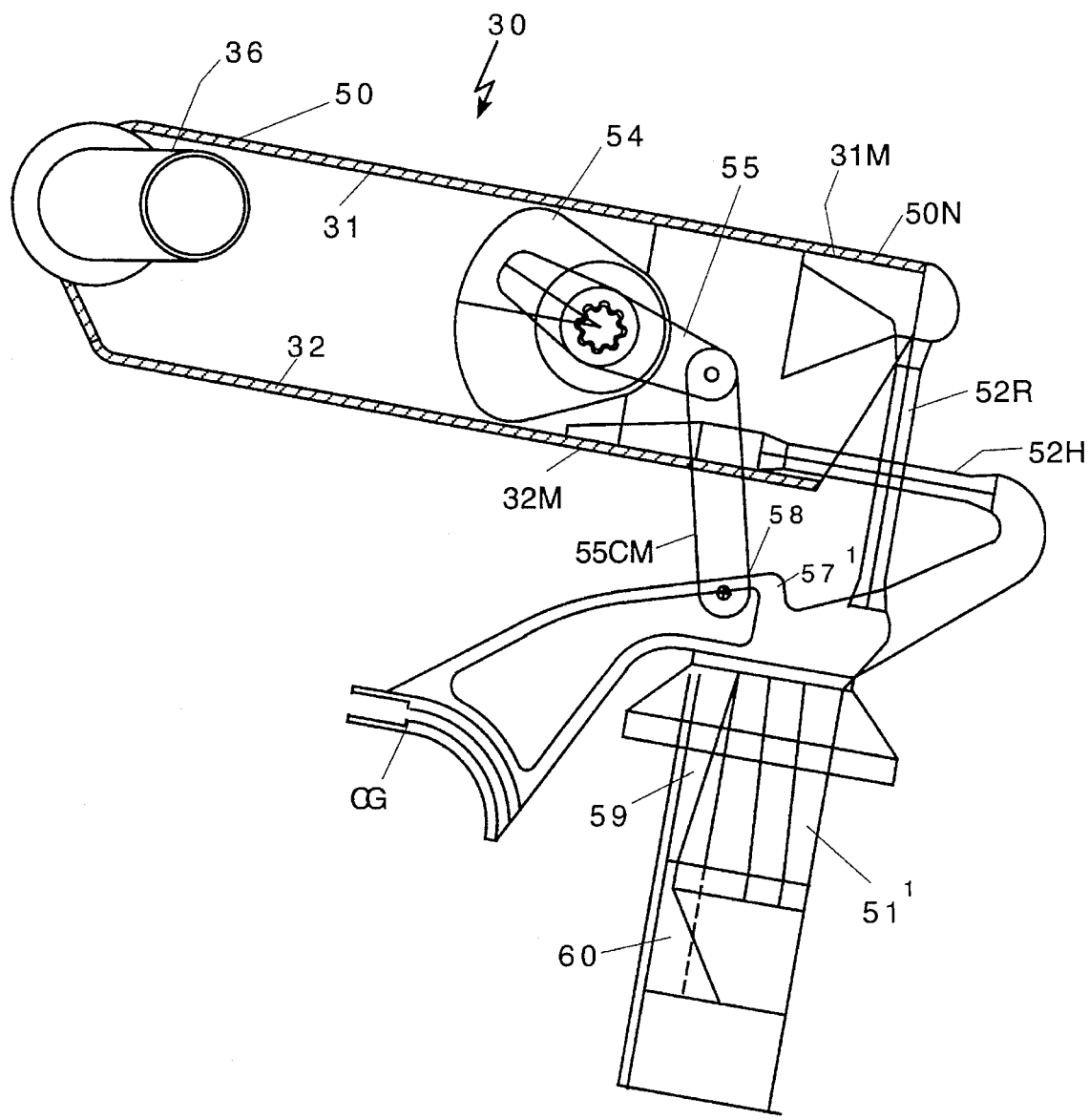

As shown in FIGS. 3*a*, 3*b* and 3*c*, a monolithic composite handlebar and neck structure 50 houses rotary damper 54 and the damper linkage 55 which are coupled to spring 32 as disclosed in application Ser. No. 07/946,060 for a "HIGH EFFICIENCY BICYCLE SUSPENSION" filed Sep. 18, 1992.

Neck 30 forms a housing for portions of the handlebar suspension system shown in FIGS. 3*a*–3*c*. (It can also be used to house an speed measuring device such as a tachometer, etc. with a viewing window in the upper wall surface of the neck 30.) Neck 30 in this embodiment is a hollow rectangular tube having top and bottom walls 31, 32 and sidewalls 33, 34, these walls smoothly merging into the laterally extending bars 35, 36. Top 31 and bottom 32 walls have molded therein thin metal reinforcing plates 31M and 32M for securement by upwardly extending arms 52L and 52R and horizontal arm 52H of "X" spring 52, respectively. The securement can be adhesive or by bolts or a combination of the two securement methods.

Rotary damper 54 is secured inside neck 30 in the same way. Slots in bottom wall 32 are provided for linkage 55 cm to couple to the shafts (not shown) of the rotary damper 54.

Thus, the integrally formed neck provides a housing to protect the suspension, and at the same time, enhance the aesthetic appearance of a suspended handlebar.

The multiple leaf spring system 52 is comprised of an "X" spring integral with semicircular mounting base or stem portion 51. The X spring is comprised of two outer legs 52L and 52R, each of which is provided with a mounting arm or pad 52P for securement to the overhanging portion of neck 50N (shown in dotted section) which also mounts and houses rotary damper assembly 54 and the actuating linkage system 55 coupled thereto. Linkage system 55 includes a pair of arms 55-1 and 55-2 which ends are secured to the outwardly extending shafts of the damper wiper and opposite ends secured to the coupler member 55CM. A link support member 57 has a bifurcated end 58 which is coupled to downwardly depending coupling member portion 55CP. The base 57B of link support 57 is shaped to next in cavity 51*c* of stem 51, and has a lower edge which cooperates with wedge 60 to secure the entire assembly in the steerer tube 612 of a bicycle. Stem tightener 59 has bolt hole 59BH through which pass wedge tightener bolts 59WB to engage threaded bores 60B in wedge 60. When these bolts are rotated, they draw the wedge 60 upwardly to lock the assembly in the steerer tube 61 and at the same time, draws stem tightener and base 57B in locking relation with stem 51 in head tube 61. In a preferred embodiment, head tube and bearing assembly shown in U.S. Pat. No. 5,002,297 is used. When a bump is encountered, the X spring 52 is loaded and the linkage 55 operates the rotary damper as described earlier.

FIG. 11*c* is a partial sectional view of the handlebar suspension system. The ends of vertical springs 52L and 52R are secured (by adhesive or bolting or bolts) to the upper wall of neck 50N, which is integrally formed with handlebar 50. And the horizontal spring components 52 is similarly secured to the lower wall of hollow neck 50N. Base 51' may include an integrally formed cable guide CG.

METHODS OF MANUFACTURE

The present invention may be manufactured by several techniques. Four are listed below:

A. manufactured by rolling preimpregnated, uncured composite plies of material ("prepreg") onto a mandrel, then loading the wrapped mandrel into an external mold, then heating to cure the composite into a rigid structure.

B. manufactured by rolling preimpregnated composite plies of material ("prepreg") onto a mandrel, then pressurizing the composite material ("prepreg") onto the mandrel with tape that shrinks upon heating.

C. manufactured by loading dry fiber in wrapped, unidirectional or woven form into a mold, closing the mold, then injecting a thermosetting resin into the dry fiber bed (resin transfer molding process).

D. manufactured by rolling preimpregnated, uncured composite plies of material ("prepreg") onto a mandrel, removing the mandrel, then placing a flexible, inflatable bladder into the center of the rolled composite material and pressurizing the bladder against an external mold while heating to cure the composite into a rigid structure (internal pressurization process).

A typical manufacturing plan using prepreg in an internal pressurization process is as follows:

A. Cut kit made up of rectangular or other shaped pieces of prepreg. The size, shape and orientation of the pieces with respect to the principal fiber direction of the material determines the strength of the cured article. In the case of this invention, as shown in FIG. 3, some of the pieces will have the fibers oriented transverse to the principal axis of the bar (90 degree), some will be oriented parallel to the principal axis (0 degree), and some will be oriented at some angle to the principal axis, preferably between 20 and 65 degrees of the principal axis, more preferably between 40 and 55. degrees.

B. Lay up on table. The plies are laid down in the order the design calls for. They may be laid down on top of each other on the table, in which case, when they are rolled, they will produce an interleaved structure with alternating 0 and 90 degree plies. They may be laid down sequentially, in which case the 90 degree plies will be grouped separately from the 0 degree plies through the thickness of the laminate.

C. Roll the lay up onto a mandrel.

D. Withdraw mandrel.

Insert inflatable bladder into hollow roll of prepreg.

E. Bend layup and load in mold.

F. Shut mold.

H. Apply pressure to bladder.

I. Heat cure.

In one embodiment, the present invention provides a hollow tubular structure with laminated layers of composite material made up of structural fibers usable to make composite materials and a heat curable thermosetting resin.

In another embodiment, the present invention provides a hollow tubular structure made up of structural fibers usable to make composite materials and a structural thermoplastic resin.

In another embodiment, the present invention provides a composite hollow tubular bicycle handlebar made with unidirectional axial fiber layers and unidirectional transverse or hoop fiber layers with hoop fibers interleaved with axial fibers. The interleaving of the fibers in the layup improves damage tolerance in the structure and improves the manufacturability of the part by making the prepreg easier to roll up.

In another embodiment, the present invention provides a composite hollow tubular bicycle handlebar made with unidirectional axial fiber layers and unidirectional transverse or hoop fiber layers with hoop fibers on the inner and outer surfaces of the tube, while the axial fibers form the middle layers of the laminate. (see FIG. 2b) This arrangement is designed to provide the maximum stiffening effect in the hoop direction to resist crippling of the bar during loading in flexure.

In another embodiment, the present invention provides a composite hollow tubular bicycle handlebar made with unidirectional axial fiber layers and unidirectional transverse or hoop fiber layers with axially tapered axial fiber. (see FIG. 2c) The amount of axial fiber is at a maximum at the center of the bar, where the moment is the highest when it is loaded in flexure. The amount of fiber decreases toward the two ends of the bar, where bending moment decreases. This allows for a reduction in the final weight of the bar.

In another embodiment, the present invention provides a composite hollow tubular bicycle handlebar made with unidirectional axial fiber layers and unidirectional transverse or hoop fiber layers with extra axial fiber on the bottom surface of the bar to provide extra strength in compression. This improves the weight efficiency of the structure by selectively strengthening the tube against compression. Compressive strength of carbon/epoxy composites is generally only 75 to 80% of tensile strength, so a beam design with equal loads on the compression and tension sides and a proportionately greater cross-sectional area of material on the compression side will give balanced stresses on each side of the beam.

In another embodiment, the present invention provides a composite hollow tubular bicycle handlebar made with unidirectional axial fiber layers and unidirectional transverse or hoop fiber layers with extra hoop fiber layers near the center of the bar. This provides extra resistance to crippling where the moment is highest. The extra fiber may be incorporated by adding extra plies to the layup or by making the hoop fiber plies trapezoidal in shape so that when the layup is rolled up, there is a longer wrap of hoop fiber around the center of the bar than around the areas near the end of the bar. This tailoring of material amounts to match the areas of highest stress allows for weight reduction in the structure.

In another embodiment, the present invention provides a composite hollow tubular bicycle handlebar made with unidirectional axial fiber layers and unidirectional transverse or hoop fiber layers with a center metal sleeve section on the inside or outside of the bar. In FIG. 1, the center of the bar is secured to the bicycle by a metal clamp. Composites are generally poorer in bearing strength and abrasion resistance than metals. Sleeve 15 is metal in the center section of the bar to improve resistance to clamping forces when compared to an all composite design, and if the sleeve is external it improves abrasion resistance. The sleeve is limited to a short section (approximately 3⅜") in the center of the bar to minimize weight. A narrow (1½") strip of hoop fiber is added to the bar at the edges of the sleeve (see the center steps in FIG. 3, layer B) to increase crippling resistance in these areas and thus increase flexure strength. As shown in FIG. 4, the wall thickness of metal sleeve 15 tapers for ¾" of length at each end to smooth the transition from the metal/composite construction to the all-composite construction and to prevent the fibers from being molded into a sharp bend at the sleeve edge or creating a stress riser in the finished part.

In another embodiment, the present invention provides a composite hollow tubular bicycle handlebar made with unidirectional axial fiber layers and unidirectional transverse or hoop fiber layers with a short (¾") metal end sleeve sections 17 and 18 on the outside of the bar, on each end. The end sleeves 17 and 18 are to resist end impacts such as from minor crashes and the extra stress placed on the bar when bar end extensions are mounted.

In another embodiment, the present invention provides a hollow tubular structure made up of T700 carbon fibers (TM Toray Co.) in R6264 resin (TM Ciba-Geigy Co.) in the axial direction layered, laminated or interleaved with M40J graphite fibers (TM Toray Co.) in 920 resin (TM Ciba-Geigy Co.) in the hoop direction.

In various embodiments, the surface texture of the handlebar may be altered by modifying the surface of the mold used to make the handlebar to improve adhesion of hand grips to the handlebar or to improve the visual appearance of the handlebar. For example, a matte, etched, pebbled, beaded or grained surface finish may be produced by blasting the mold surface with abrasive grit, glass beads or steel shot. This treatment may be used on the ends of the bar or at its center.

In another embodiment, the present invention provides a composite hollow tubular bicycle handlebar made with unidirectional axial fiber layers and unidirectional transverse or hoop fiber layers with a total mass less than 110 grams and a flexure strength greater than 900 pounds in 3 point bending on a 20 inch span.

In another embodiment, the present invention provides a composite hollow tubular bicycle handlebar made with unidirectional axial fiber layers and unidirectional transverse or hoop fiber layers with the handlebar integrally molded into a stem or neck which attaches it to the bicycle. This allows the total weight of the handlebar/stem/neck structure to be reduced, since fasteners are eliminated and clamping forces on the center of the bar are eliminated.

In another embodiment, the present invention provides a composite hollow tubular bicycle handlebar made with unidirectional axial fiber layers and unidirectional transverse or hoop fiber layers with an outside surface covering of hoop fiber. This outside layer is made up of unidirectional fiber, which produces a high quality molded finish and protects the inner plies from damage. It also adds to the crippling resistance of the bar in flexure.

In another embodiment, the present invention provides a composite hollow tubular bicycle handlebar made with unidirectional axial fiber layers and unidirectional transverse or hoop fiber layers with an outer surface covering of woven fiber cloth. This layer adds torsional strength and stiffness to the bar to resist twisting moments that are introduced through bar end extensions, and provides an outer protective layer for the main load-bearing axial and hoop fiber layers.

In another embodiment, the present invention provides a composite hollow tubular bicycle handlebar made with unidirectional axial fiber layers and unidirectional transverse or hoop fiber layers with an outer surface covering of unidirectional fiber at some angle to the axis of the bar, preferably +/−45 degrees. This layer adds torsional strength and stiffness to the-bar to resist twisting moments that are introduced through bar end extensions, and provides an outer protective layer for the main load-bearing axial and hoop fiber layers.

In another embodiment, the present invention provides a composite hollow tubular bicycle handlebar made with unidirectional axial fiber layers and unidirectional transverse or hoop fiber layers with axial fibers with a lower tensile modulus than that of the hoop fibers. This allows the bar to flex moderately in bending, providing a more supple ride, but maintains the benefit of high crippling resistance with minimum weight.

In another embodiment, the present invention provides a composite hollow tubular bicycle handlebar made with unidirectional axial fiber layers and unidirectional transverse or hoop fiber layers with axial fiber with a tensile modulus of 30 to 40 million pounds per square inch. This provides for a bar with a more comfortable ride than if a comparable amount of higher modulus fiber is used.

In another embodiment, the present invention provides a composite hollow tubular bicycle handlebar made with unidirectional axial fiber layers and unidirectional transverse or hoop fiber layers with hoop fiber with a tensile modulus above 40 million pounds per square inch. This provides for a bar with the maximum amount of crippling resistance and the minimum weight, since crippling resistance is a function of material stiffness.

In another embodiment, the present invention provides a composite hollow tubular bicycle handlebar made with unidirectional axial fiber layers and unidirectional transverse or hoop fiber layers with a center diameter greater than one inch. This provides for a bar with lower stress in the center for a given bending moment, since the increased diameter gives a larger moment of inertia in the equation:

$$\text{stress} = \frac{\text{Moment} \times \text{distance from neutral axis}}{\text{Moment of inertia}}$$

In another embodiment, the present invention provides a composite hollow tubular bicycle handlebar made with unidirectional axial fiber layers and unidirectional transverse or hoop fiber layers with hoop fiber with an end diameter of ⅞". This makes the bar compatible with commercially available bicycle accessories.

In another embodiment, the present invention provides a composite hollow tubular bicycle handlebar made with unidirectional axial fiber layers and unidirectional transverse or hoop fiber layers which is molded inside a thin metal tube. This tube serves to contain the composite, can be used to resist pressure developed internally during molding, and eliminates problems with poor molded surface quality which can develop in all-composite products.

In another embodiment, the present invention provides a composite hollow tubular bicycle handlebar made with unidirectional axial fiber layers and unidirectional transverse or hoop fiber layers which has an outer layer of glass fiber or aramid fiber composite. This type of outer layer provides a protective layer against impact damage and galvanic corrosion between the carbon fibers and aluminum accessories, and, in the case of the glass fiber composite, contributes to an improved surface finish after molding.

In another embodiment, the present invention provides a composite hollow tubular bicycle frame tube with unidirectional axial fiber layers and unidirectional transverse or hoop fiber layers. The benefits of this form of composite construction (low weight, high crippling resistance, good fatigue resistance, stiffness, etc.) could be applied to the manufacture of the main frame tubes and stays in a bicycle frame.

In another embodiment, the present invention provides a composite hollow tubular bicycle fork tube with unidirectional axial fiber layers and unidirectional transverse or hoop fiber layers. The benefits of this form of composite construction (low weight, high crippling resistance, good fatigue resistance, high stiffness, etc.) could be applied to the manufacture of bicycle fork structures.

In another embodiment, the present invention provides a composite hollow tubular bicycle seat post tube with unidirectional axial fiber layers and unidirectional transverse or hoop fiber layers. This design would provide a lightweight seat post design with high fatigue resistance. A thin metal sleeve on the outside of the composite could be incorporated to give added abrasion and crush resistance.

While preferred embodiments of the invention have been described and illustrated, it will be apparent that other embodiments, modifications and adaptations of the invention will be readily apparent to those skilled in the art.

What is claimed is:

1. Composite hollow tubular bicycle handlebar having lateral ends of the same diameter, said composite hollow tubular bicycle handlebar including three fiber layers in a resin matrix, including unidirectional axial fiber and hoop fiber layers, and wherein said handlebar has bend, taper and clamp center sections and a pair of grip end regions, each region having a crossectional area, and the cross-sectional area and linear fiber weight of unidirectional axial fiber are greater in the bend, taper and clamp center sections than in the grip lateral end regions, and a metal sleeve in said clamp center section.

2. The handlebar defined in claim 1 wherein said hoop fiber layers sandwich said unidirectional axial fiber layer.

3. The handlebar defined in claim 1 wherein said hoop fibers are interleaved with said unidirectional axial fiber layer and said hoop fiber layers are on the inner and outer surfaces of said unidirectional axial fiber layer.

4. The handlebar defined in claim 1 wherein said handlebar has lower and forward sections of said handlebar near the center of said bar and adjacent said bends in the bar, the cross-sectional area and linear fiber weight of said unidirectional axial fiber layer is greater in the portion of the bar which experiences high compressive loading, comprising the lower and forward sections of the tube wall near the center of the bar and adjacent to the bends in the bar.

5. The handlebar defined in claim 1 having total mass of less than 110 grams.

6. The handlebar defined in claim 1 including an integrally molded neck on said handlebar and wherein said neck is hollow and adapted to house a portion of a bicycle shock absorber.

7. The handlebar defined in claim 1 including a surface covering of hoop, fiber.

8. The handlebar defined in claim 1 including a surface covering of woven fiber cloth.

9. The handlebar defined in claim 1 wherein said axial fiber has lower elastic modulus than said hoop fiber.

10. The handlebar defined in claim 1 wherein said axial fibers have carbon fiber modulus range.

11. The handlebar defined in claim 1 wherein said hoop fiber are carbon fiber with elastic modulus greater than 40 million psi.

12. The composite handlebar defined in claim 1 including an outer layer of fibers selected from glass and/aramid fiber and mixtures thereof.

13. Composite hollow tubular bicycle handlebar having lateral ends of the same diameter and a bend, taper and clamp center section, said handlebar including three fiber layers, including unidirectional axial fiber and unidirectional transverse and hoop fiber layers and an outer surface, and a metal sleeve on the outer surface of said center section.

14. The handlebar defined in claim 1 wherein said hoop fiber layers sandwich said unidirectional axial fiber layer.

15. The handlebar defined in claim 1 wherein said hoop fibers layer are interleaved with said axial fiber layer and said hoop fiber layers are on the inner and outer surfaces of said axial fiber layer.

16. The handlebar defined in claim 1 wherein said handlebar has bend, taper and clamp center sections and a pair of grip or end regions and the cross-sectional area and linear fiber weight of axial fiber are greater in the bend, taper and clamp center sections than in the grip lateral end regions.

17. The handlebar defined in claim 1 wherein said handlebar has lower and forward sections of said tube near the center of said bar and adjacent bends in the bar, the cross-sectional area and linear fiber weight of said axial fiber layer is greater in the portion of the bar which experiences high compressive loading, comprising the lower and forward sections of the tube wall near the center of the bar and adjacent to the bends in the bar.

18. The handlebar defined in claim 1 wherein said handlebar has bend, taper and clamp center sections and a pair of grip end regions and the cross-sectional area and linear fiber weight of hoop fiber is greater in said bend, taper and clamp or center sections than in said grip end regions.

* * * * *